US007637686B2

(12) United States Patent
Wood et al.

(10) Patent No.: US 7,637,686 B2
(45) Date of Patent: Dec. 29, 2009

(54) SWIVEL FITTING ATTACHMENT APPARATUS

(75) Inventors: Jeffrey H. Wood, Eureka, MO (US); Lamvien H. Ngo, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/713,446

(22) Filed: Mar. 2, 2007

(65) Prior Publication Data

US 2008/0213034 A1 Sep. 4, 2008

(51) Int. Cl.
*B64C 1/20* (2006.01)

(52) U.S. Cl. .......................... 403/302; 403/77; 403/79; 403/148; 403/289; 403/313; 244/118.1; 244/131

(58) Field of Classification Search .................. 403/55, 403/62, 76, 77, 79, 122, 141, 142, 145, 148, 403/289, 290, 301, 302, 305, 309, 313; 244/115, 244/118.1, 131, 132
See application file for complete search history.

(56) References Cited

U.S. PATENT DOCUMENTS 687,183 A * 11/1901 Kolander .................... 403/141
892,105 A * 6/1908 White ........................ 403/141
1,435,406 A * 11/1922 Lumsden .................... 403/148
1,449,034 A * 3/1923 Calaway ..................... 403/141
1,490,304 A * 4/1924 Zink .......................... 403/141
1,932,697 A * 10/1933 Jankovic ..................... 403/142
3,130,989 A * 4/1964 Lannen ....................... 403/142
3,137,887 A * 6/1964 Mannino et al. .............. 16/2.1
3,451,181 A * 6/1969 Neuschotz ................. 52/787.1
4,307,864 A 12/1981 Benoit
4,981,735 A * 1/1991 Rickson ..................... 428/36.9
5,108,048 A * 4/1992 Chang ..................... 244/118.1
5,542,777 A 8/1996 Johnson
6,769,831 B2 * 8/2004 Aquino et al. ................ 403/83
6,883,753 B1 * 4/2005 Scown ..................... 244/118.1
6,889,939 B2 * 5/2005 Rouyre et al. ............... 244/131
7,226,233 B2 * 6/2007 SuBenbach et al. ......... 403/143
2003/0168554 A1 9/2003 Rouyre et al.

FOREIGN PATENT DOCUMENTS

GB 1 353 236 A 5/1974

OTHER PUBLICATIONS

International Search Report and Written Opinion of the International Searching Authority for International Application No. PCT/US2008/051567 dated Jun. 2, 2008.

* cited by examiner

*Primary Examiner*—Michael P Ferguson
(74) *Attorney, Agent, or Firm*—Toler Law Group

(57) ABSTRACT

An exemplary, non-limiting swivel fitting attachment apparatus includes a ball fitting and a swivel fitting. The ball fitting includes a base having an attachment portion, such as a flange, arranged for attachment to a structure and a ball attachable to the base. The ball may be removably attachable or fixedly attached to the base. The swivel fitting has a first end having a socket portion that is arranged to receive the ball therein and a second end having an attachment portion that is arranged for attachment to an object. The socket portion of the swivel fitting may be expandable and closeable over the ball, and may include first and second socket portion members that are urgeable toward and away from each other. The second end of the swivel fitting may be couplable to a clevis fitting.

10 Claims, 6 Drawing Sheets

28 30 10 14 24 58 26 22 12 20 18 16 32

SWIVEL FITTING ATTACHMENT APPARATUS

BACKGROUND

Components of systems and subsystems are attached to structural members in a wide variety of settings, such as aircraft. As an example, commercial aircraft structures are historically comprised of thin-skinned shells of aluminum stiffened by longitudinal stringers or longerons that are supported by transverse hoop frames to form a semi-monocoque structure. This conventional structure enables the integration of subsystems, such as ventilation ducting, electrical routing, luggage stowage compartments, flight deck overhead instrument panels, and the like. In such applications, simple aluminum brackets can be sized and shaped to suit an application and can be installed onto longerons or hoop frames using basic fasteners such as rivets or bolts. Subsystem components, such as stowage compartments and the like, typically are suspended from multiple tie rods attached to the brackets that are mounted on the longerons or hoop frames.

However, many newer commercial aircraft are departing from the conventional semi-monocoque aluminum fuselage structures in favor of composite monocoque structures using honeycomb sandwiched skin panels. These honeycomb skin structures offer many weight, strength, and fatigue resistant benefits. The honeycomb skin structures also present an internal smooth surface of the fuselage body because there are no longer any exposed stringers, longerons, or hoop frames. Because of this absence of exposed longerons or hoop frames, clips and/or brackets can not be attached in locations as desired to integrate subsystems.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

An exemplary, non-limiting swivel fitting attachment apparatus includes a ball fitting and a swivel fitting. The ball fitting includes a base having an attachment portion arranged for attachment to a structure and a ball attachable to the base. The swivel fitting has a first end having a socket portion that is arranged to receive the ball therein and a second end having an attachment portion that is arranged for attachment to an object.

According to an aspect, the attachment portion may include a flange.

According to another aspect, the ball may be ball removably attachable to the base or the ball may be fixedly attached to the base, as desired. As an example when the ball is removably attachable to the base, the ball may be mounted on a threaded shaft that is threadedly receivable in the base. Alternately and as another example when the ball is fixedly attached to the base, the ball and the base may be machined into the ball fitting.

According to another aspect, the socket portion of the swivel fitting may be expandable and closeable over the ball.

For example, the socket portion may includes first and second socket portion members that are urgeable toward and away from each other. A threaded fastener may be threadedly receivable in the first and second socket portion members. If desired, the second end of the swivel fitting may be couplable to a clevis fitting.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
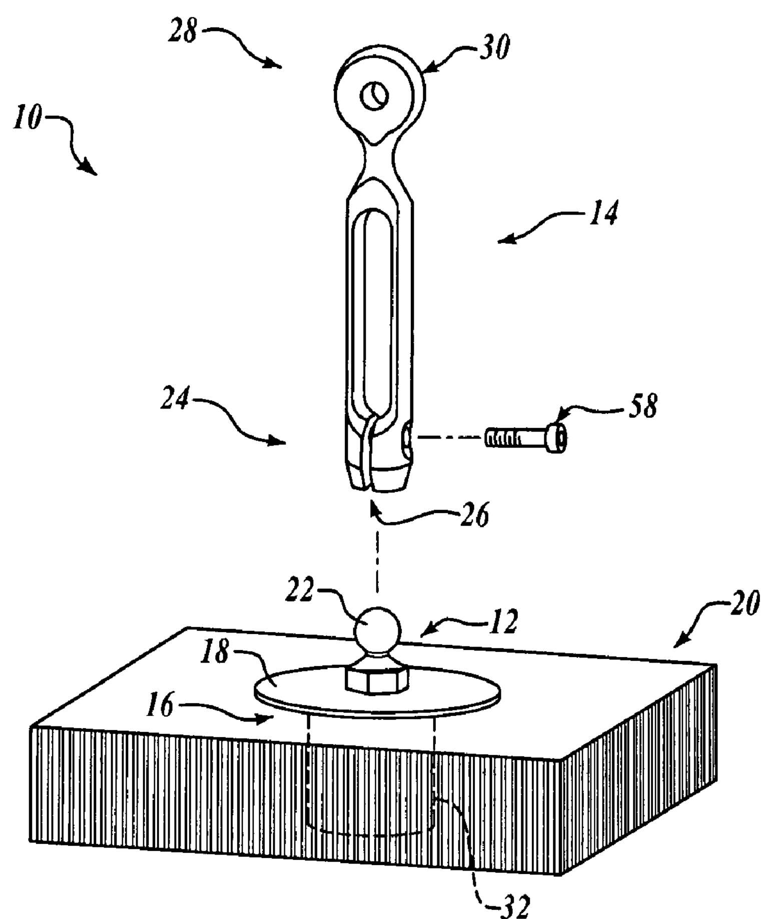
FIG. 1 is a perspective, exploded view of an exemplary swivel fitting attachment apparatus according to an embodiment.

By way of overview and referring to FIG. 1, an exemplary, non-limiting swivel fitting attachment apparatus 10 includes a ball fitting and a swivel fitting. The ball fitting 12 includes a base 16 having an attachment portion 18 arranged for attachment to a structure 20 and a ball 22 attachable to the base 16. The swivel fitting 14 has an end 24 having a socket portion 26 that is arranged to receive the ball 22 therein and an 28 end having an attachment portion 30 that is arranged for attachment to an object (not shown). As a result, exemplary swivel fitting attachments described herein may be used to attach objects, such as components of systems or subsystems, at desired locations to honeycomb structures that do not include stringers, longerons, or frames. Details will be set forth below.

Figure 2:
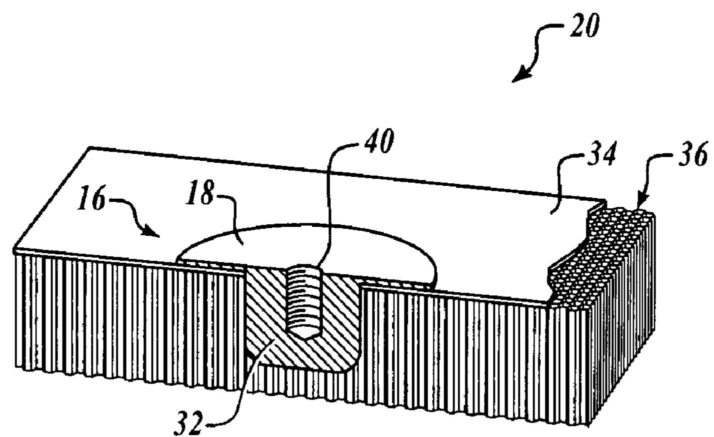
FIG. 2 is a perspective, cutaway view of a component of the apparatus of FIG. 1.

Referring additionally to FIG. 2, the base 16 includes the attachment portion 18 and an anchor portion 32 (shown in phantom in FIG. 1). The attachment portion 18 suitably is a flange. The attachment portion 18 is placed on top of skin 34 of a honeycomb core 36 of the structure 20 or in a counterbored hole (not shown) in the structure 20 such that the attachment portion 18 is approximately flush with the skin 34. The attachment portion 18 is attached, such as by bonding, to the structure 20 with a suitable adhesive that is selected as desired for a particular application. Size of the attachment portion 18 (for example, as measured by a dimension like diameter of a flange) may be determined based upon loading expected in a particular application. For example, use of a larger diameter flange can increase surface area available for bonding, thereby increasing strength of the bond between the attachment portion 18 and the structure 20.

The anchor portion 32 suitably has a shape, such as a cylindrical shape, that corresponds to a hole in the honeycomb core 36. As such, the anchor portion 32 is received in the hole in the honeycomb core 36 and the attachment portion 18 rests on top of the skin 34 or is approximately flush with the skin 34. The anchor portion 32 is bonded to the structure 20 with a suitable adhesive that is selected as desired for a particular application.

Figure 3:
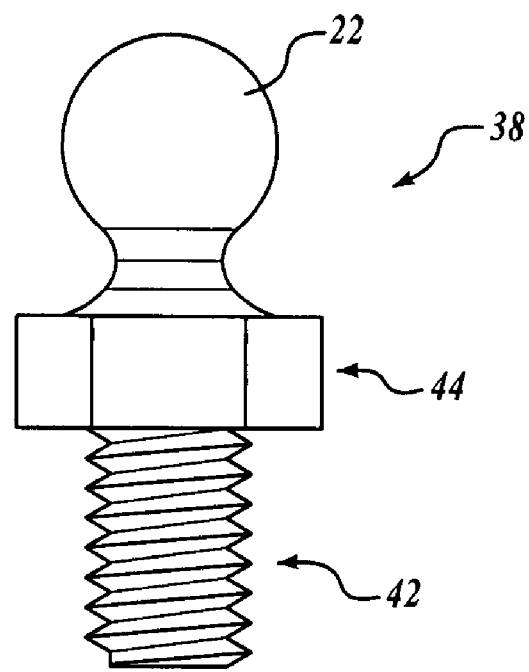
FIG. 3 is a side view of another component of the apparatus of FIG. 1.

Referring additionally to FIG. 3, in one exemplary embodiment of the ball fitting 12 the ball 22 is removably attachable to the base 16. For example, a ball assembly 38 that includes the ball 22 may be screwed into the base 16. Thus, the ball assembly 38 can be replaced if the ball 22 becomes damaged. Also, several ball assemblies 38 having differently-sized balls 22 may be used as desired for different applications, depending upon factors such as size constraints, loading, or the like.

A threaded hole 40 is drilled and tapped in the ball fitting 12 from a center of the attachment portion 18 down into the anchor portion 32. The ball 22 is mounted on a threaded shaft 42 having a same thread size as that of the threaded hole 40. The threads of the threaded hole 40 and the threaded shaft 42 can be sized as desired depending upon loading for an attached component or subsystem or the like. A hexagonal base 44 suitably is provided between the ball 22 and the threaded shaft 42 to permit engaging the hexagonal base 44 with a tool, such as a wrench, and tightening the ball assembly 38 against the base 16.

The base 16 suitably may be made out of any material as desired for a particular application. For example, the base 16 may be made out of a metal or a composite material. As another example, the base 16 may be made of a thermoset polymer for light load applications. The base 16 may be made in any suitable manner for a particular application, such as by machining metal or composite materials or by injection molding a thermoset polymer.

Figure 4:
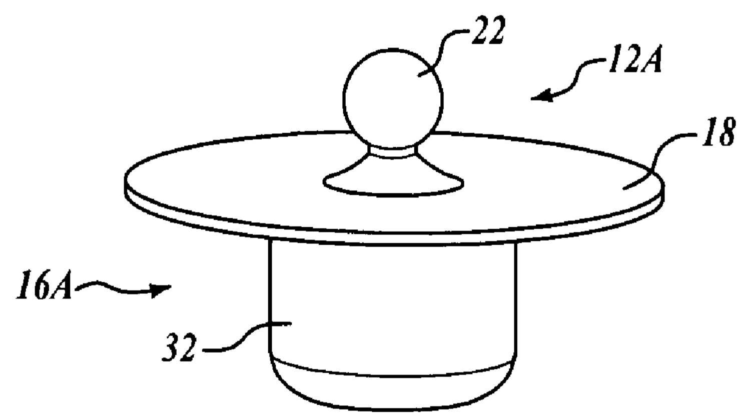
FIG. 4 is a perspective view of a component of an exemplary swivel fitting attachment apparatus according to another embodiment.

Referring now to FIG. 4, in another exemplary embodiment of a ball fitting 12A the ball 22 is fixedly to a base 16A. The base 16A includes the attachment portion 18 and the anchor portion 32 as described above. However, the ball 22 is not removably replaceable as described above for the ball fitting 12 (FIG. 1). Instead, the ball 22 is fixedly attached to the base 16A, such as by machining the ball fitting 12A from one piece of metal or composite material or injection molding a thermoset polymer as desired for a particular application. Thus, the ball fitting 12A can provide for reduced part counts and ease of manufacturing.

Figure 5A:
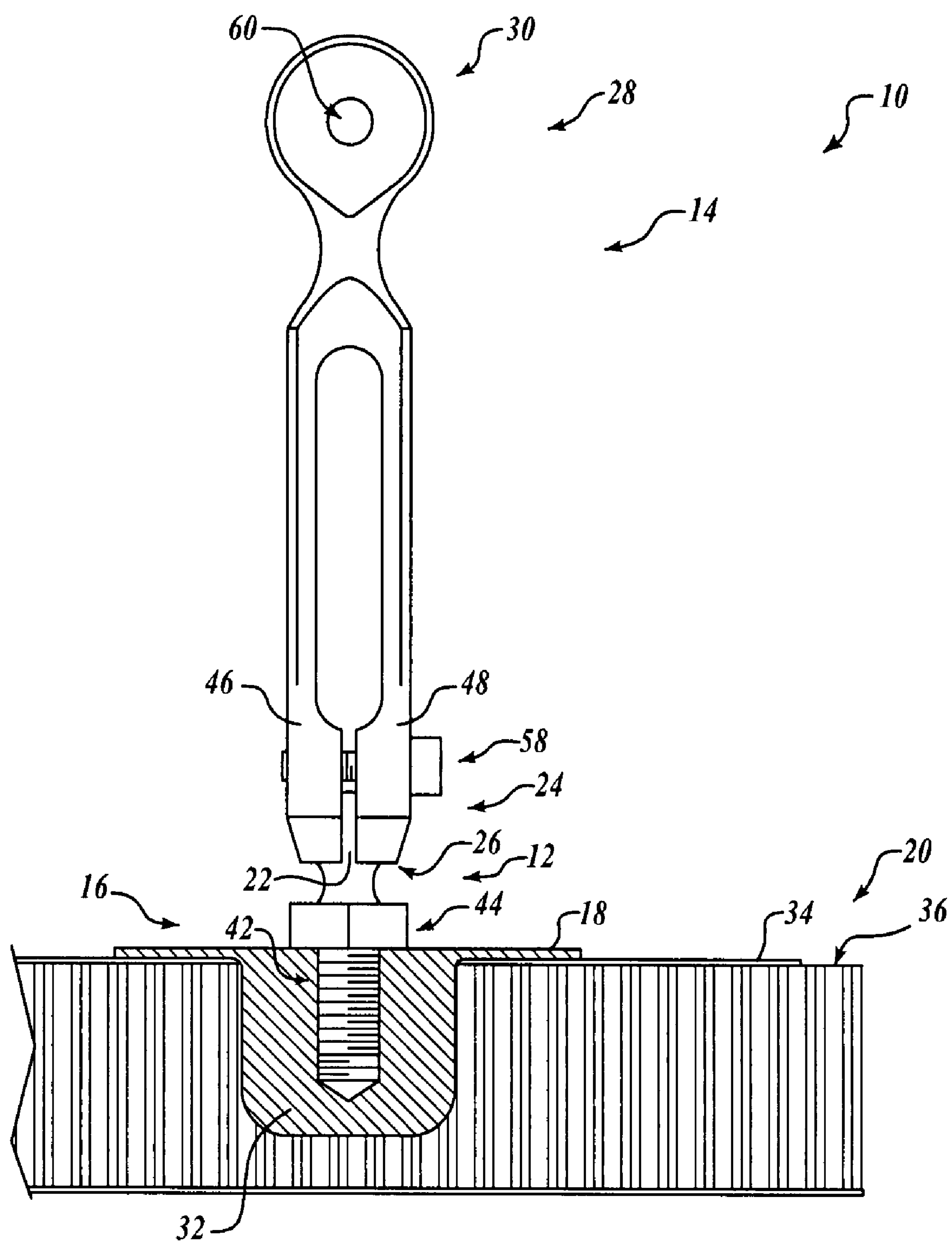
FIG. 5A is a partially cutaway side view of the apparatus of FIG. 1.
Figure 5B:
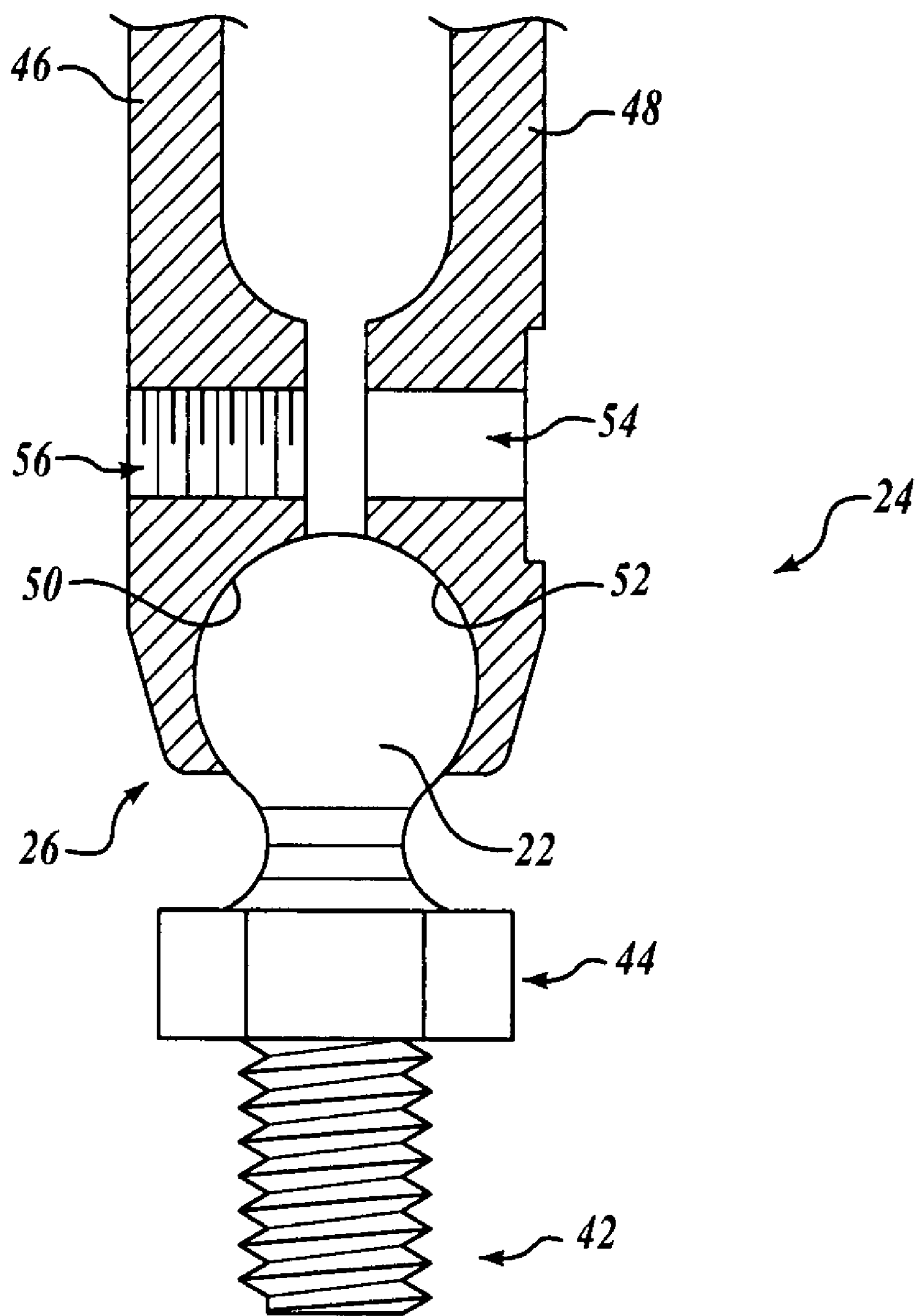
FIG. 5B illustrates details of the apparatus of FIG. 5A.

Referring now to FIGS. 1, 5A, and 5B, the swivel fitting 14 mates with the ball fitting 12 or 12A (FIG. 4). In an exemplary embodiment, the swivel fitting 14 suitably is implemented as a rod with two members 46 and 48. The members 46 and 48 originate from an area of origin near the end 28 and extend separate from each other toward the end 24. At the end 24, interior surfaces of 50 and 52 of the members 46 and 48, respectively, form the socket portion 26 as a split socket that is suitably sized to mate with the ball 22.

A hole 54 is defined through the member 48 above the surface 52. The hole 54 suitably is not threaded. A threaded hole 56 is defined in the member 46 above the surface 50.

The socket portion 26 is split to allow the members 46 and 48 to be urged apart and expand over the ball 22 during installation. A threaded fastener 58, such as a cross screw, is inserted through the hole 54. The threaded fastener 58 is tightened to threadedly engage threads in the threaded hole 56. Tightening the threaded fastener 58 tightens or clamps the surfaces 50 and 52 of the members 46 and 48 toward each other and against the ball 22 into contact with the ball 22.

Referring back to FIGS. 1 and 5A, the attachment portion 30 is provided at the end 28 to permit attachment with an object (not shown). In an exemplary embodiment given by way of example and not of limitation, the end 28 of the swivel fitting 14 terminates at a disk-shaped member that is cross-drilled to define a hole 60 to permit mating with common clevis fittings (not shown). As another example, the end 28 may terminate as a common rod end with a spherical bearing (not shown). It is emphasized that termination of the end 28 is not intended to be limited, but rather the end 28 may terminate in any configuration as desired for attachment to any object, component, subsystem, or the like, as desired.

Figure 6:
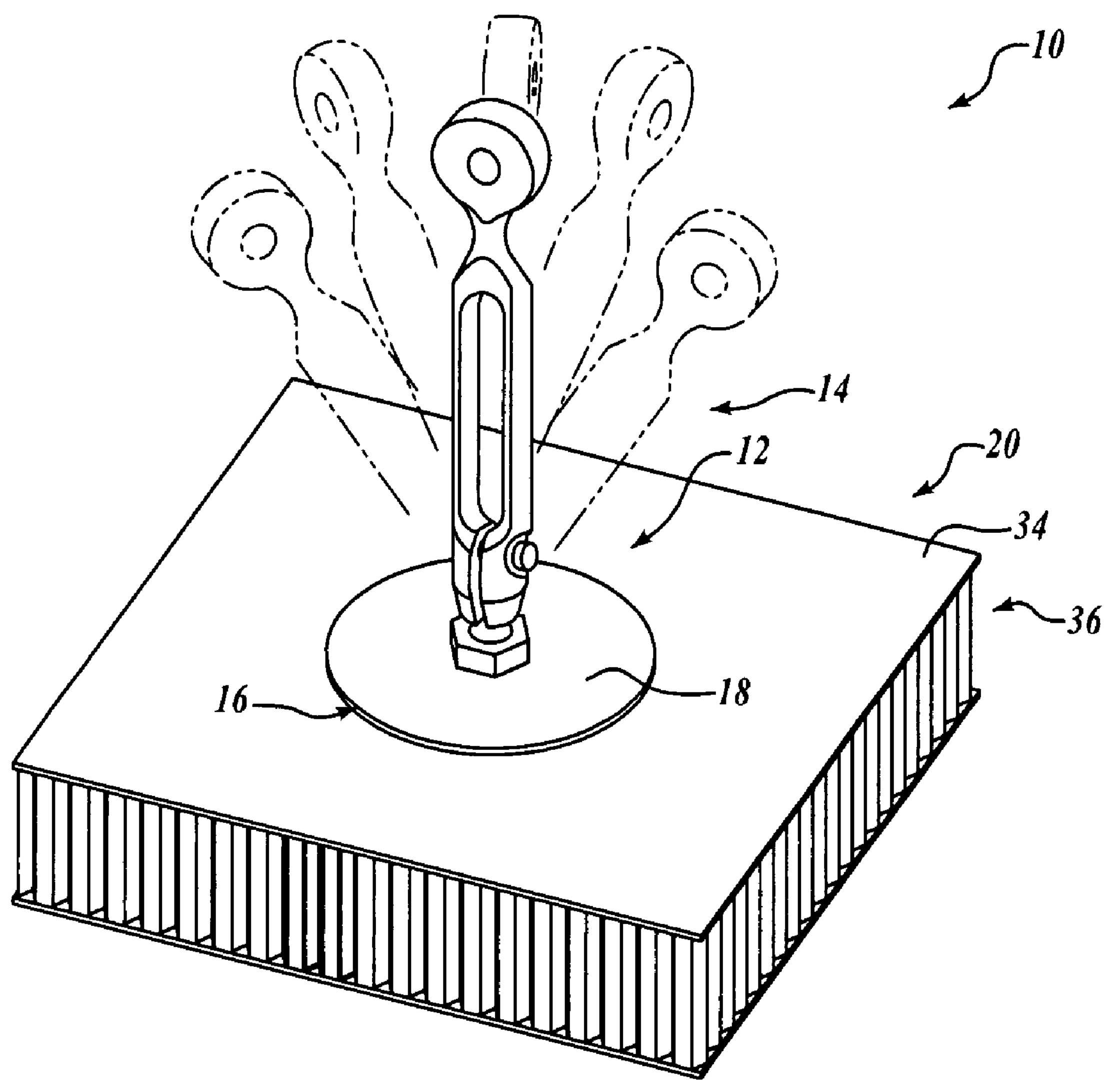
FIG. 6 is a perspective view that illustrates swiveling.

Referring now to FIG. 6, the ball 22 allows the swivel fitting 14 to rotate omnidirectionally about the ball fitting 12 or 12A (FIG. 4). Omnidirectional rotation of the swivel fitting 14 can help minimize installing close tolerance location of associated fittings in the attachment assembly 10. Omnidirectional rotation allows the ball fitting 12 to be proximately located within the structure 64 prior to installation of the component 62. This is due to the ability of the swivel fitting 14 to adjust or compensate for this loosely controlled location by swiveling into a position towards the mating attachment portion 30 in the component 62.

Figure 7:
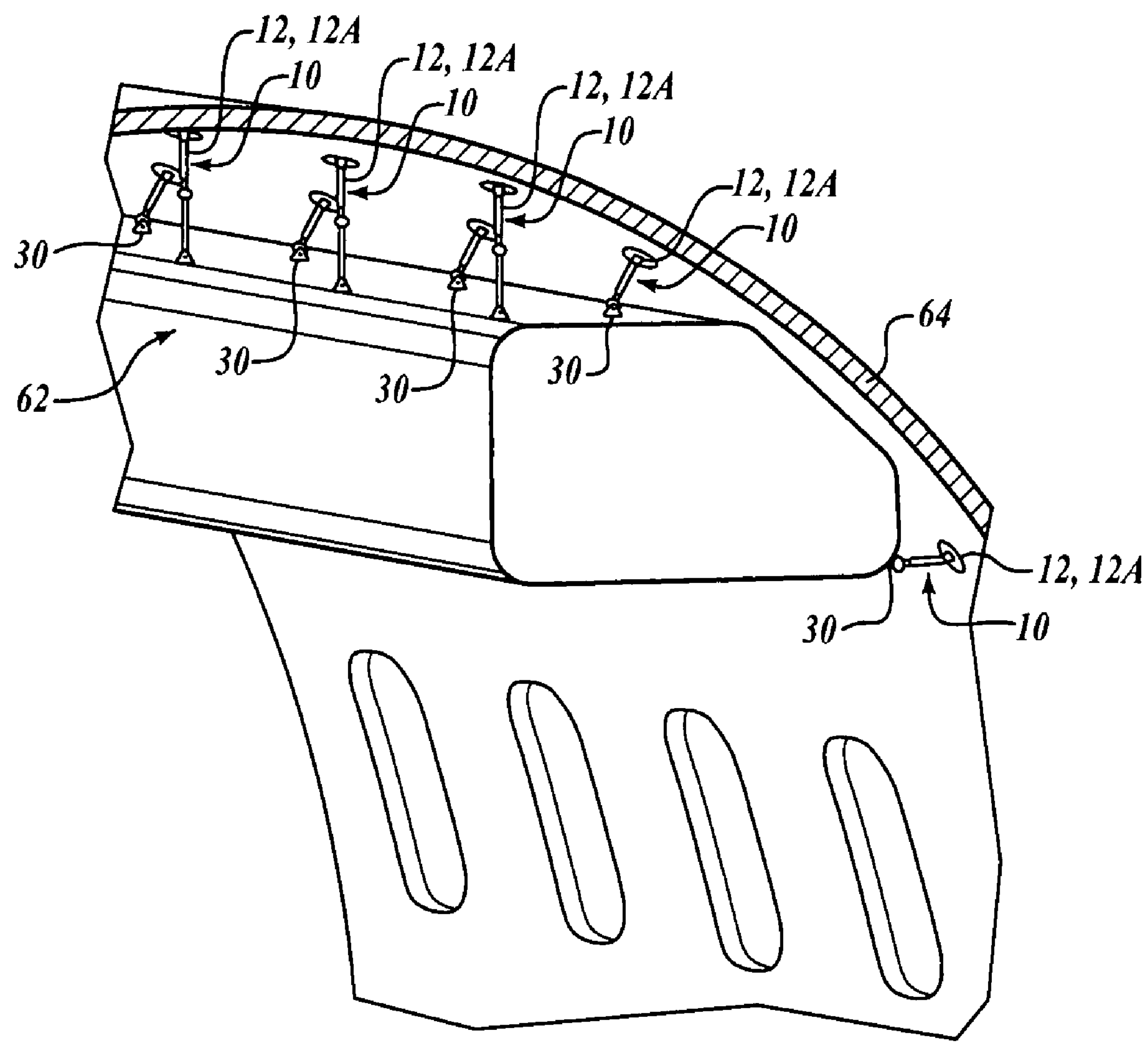
FIG. 7 is a partial cutaway, perspective view of an exemplary application of an exemplary swivel fitting attachment apparatus.

Referring now to FIG. 7, the swivel fitting attachment apparatus 10 can be installed anywhere as desired to integrate a component 62, such as without limitation a stowage bin, ventilation ducting, electrical routing, flight deck overhead instrument panels, and the like, of a subsystem in a structure 64, such as without limitation an aircraft fuselage honeycomb skin structure. The ball fittings 12 or 12A are mounted in counterbored holes in the structure 64 as described above. The component 62 is attached to the attachment portion 30 with a suitable fitting, such as without limitation a clevis fitting.

Thus, embodiments disclosed herein can use simple, inexpensive, and generally available attachment components and fittings for attaching components of subsystems to structures in any location as desired. This approach can help reduce cost and cycle time entailed in integrating subsystems in structures, such as without limitation composite fuselage structures, masonry building structures, ship or submarine subsystems suspension, and the like.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. An aircraft subsystem attachment device, comprising:

a flange having a first side adhesively bonded to a skin of a honeycomb composite structure;

an anchor portion coupled to the first side of the flange, wherein the anchor portion projects through the skin of the honeycomb composite structure into a core of the honeycomb composite structure while the first side of the flange is bonded to the skin of the honeycomb composite structure;

a ball fixedly coupled to a second side of the flange opposite the first side of the flange, wherein the ball extends away from the skin of the honeycomb composite structure; and a swivel fitting removably coupled to the ball, wherein the swivel fitting is rotatably movable around the ball to support a load attached to the swivel fitting, the swivel fitting comprising:

a socket portion comprising a pair of socket portion members at one end of the swivel fitting;

an attachment portion configured to receive a pivotable fitting for attachment to the load at the other end of the swivel fitting; and a first rod member and a second rod member each extending from the attachment portion to one of the socket portion members, wherein the first and second rod members are configured to be urged apart to urge the pair of socket portion members apart to expand over and receive the ball into the socket portion, and wherein each of the socket portion members is configured to receive a fastener to secure the plurality of socket portion members together to rotatably engage the ball once the ball has been received into the socket portion.

2. The aircraft subsystem attachment device of claim 1, wherein the flange and the ball are formed as one piece.

3. The aircraft subsystem attachment device of claim 1, wherein the flange rests above the skin of the honeycomb composite structure.

4. The aircraft subsystem attachment device of claim 1, wherein the anchor portion is configured to be adhesively bonded to the core of the honeycomb composite structure.

5. An aircraft subsystem attachment device, comprising:

a flange adhesively coupled to a skin of a honeycomb composite structure;

an anchor portion coupled to the flange, wherein the anchor portion projects through the skin of the honeycomb composite structure into a core of the honeycomb composite structure while the flange is bonded to the skin of the honeycomb composite structure, and wherein a threaded hole extends through the flange and through at least a portion of the anchor portion;

a ball threadably coupled within the threaded hole extending through the flange and the anchor portion; and a swivel fitting removably coupled to the ball to support a load attached to the swivel fitting, wherein the swivel fitting is rotatably movable around the ball to support the load, wherein the swivel fitting comprises:

a socket portion comprising a pair of socket portion members at one end of the swivel fitting;

an attachment portion configured to receive a pivotable fitting for attachment to the load at the other end of the swivel fitting; and a first rod member and a second rod member each extending from the attachment portion to one of the socket portion members, wherein the first and second rod members are configured to be urged apart to urge the pair of socket portion members apart to receive the ball into the socket portion, and wherein each of the socket portion members is configured to receive a fastener to secure the plurality of socket portion members together to rotatably engage the ball once the ball has been received into the socket portion.

6. The aircraft subsystem attachment device of claim 5, further comprising:

a hexagonal base coupled to the ball;

a threaded shaft coupled to the hexagonal base, the threaded shaft corresponding to the threaded hole, wherein the ball is removably coupled to the flange and the anchor portion by gripping and turning the hexagonal base to tighten the threaded shaft into the threaded hole.

7. The aircraft subsystem attachment device of claim 5, further comprising at least one second ball, the at least one second ball with a size that is different than a size of the ball, wherein the second ball is interchangeable with the ball to support a different load.

8. An aircraft structure, comprising:

a fuselage structure of an aircraft, wherein the fuselage structure includes a composite material including a honeycomb core and an interior skin;

an aircraft component securable to the fuselage structure;

a ball fitting including:

a flange having a first side attached to the fuselage structure, the flange comprising an anchor portion extending from the first side of the flange into the honeycomb core of the composite material, wherein the anchor portion is adhesively bonded to the honeycomb core of the composite material; and a ball fixedly coupled to the flange on a second side of the flange opposite the first side of the flange; and a swivel fitting removably coupled to the ball to support the aircraft component attached to the swivel fitting, wherein the swivel fitting is rotatably movable around the ball to support the aircraft component, wherein the swivel fitting comprises:

a socket portion comprising a pair of socket portion members at one end of the swivel fitting;

an attachment portion configured to receive a pivotable fitting for attachment to aircraft component at the other end of the swivel fitting; and a first rod member and a second rod member each extending from the attachment portion to one of the socket portion members, wherein the first and second rod members are configured to be urged apart to urge the pair of socket portion members apart to receive the ball into the socket portion, and wherein each of the socket portion members is configured to receive a fastener to secure the plurality of socket portion members together to rotatably engage the ball once the ball has been received into the socket portion.

9. The aircraft structure of claim 8, wherein the first side of the flange is adhesively bonded to the interior skin of the composite material.

10. The aircraft structure of claim 8, wherein the aircraft component includes one or more of a stowage bin, ventilation ducting, an electrical routing conduit, and a flight deck overhead instrument panel.

* * * * *